(12) United States Patent
Neri et al.

(10) Patent No.: US 6,477,263 B1
(45) Date of Patent: *Nov. 5, 2002

(54) METHOD OF CONTROLLING A PRINTED OBJECT

(75) Inventors: Armando Neri, Bologna; Stefano Chini, San Lazzaro di Savena, both of (IT)

(73) Assignee: Currency Systems International, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/358,345

(22) Filed: Jul. 21, 1999

(30) Foreign Application Priority Data

Jul. 24, 1998 (IT) ........................................ BO98A0458

(51) Int. Cl.[7] .................................................. G06K 9/00
(52) U.S. Cl. ........................... 382/137; 302/100; 705/45
(58) Field of Search ................................. 382/135, 137, 382/100, 112, 274; 209/534; 235/379; 250/200; 356/71; 902/7; 705/45

(56) References Cited

U.S. PATENT DOCUMENTS

| | | | |
|---|---|---|---|
| 4,131,879 A | 12/1978 | Ehrat | 340/146.3 H |
| 4,677,680 A | 6/1987 | Harima et al. | 382/1 |
| 4,879,000 A | 11/1989 | Gausa | 162/198 |
| 5,020,110 A * | 5/1991 | Chominski et al. | 382/100 |
| 5,063,528 A | 11/1991 | Miwa et al. | 364/559 |
| 5,317,390 A | 5/1994 | Bolza-Schunemann et al. | 356/394 |
| 5,578,813 A * | 11/1996 | Allen et al. | 250/205 |
| 5,995,638 A * | 11/1999 | Amidror et al. | 382/100 |
| 6,053,406 A * | 4/2000 | Litman | 235/449 |

* cited by examiner

*Primary Examiner*—Leo Boudreau
*Assistant Examiner*—Barry Choobin
(74) *Attorney, Agent, or Firm*—Stephen R. Loe; Carstens, Yee & Cahoon, LLP

(57) ABSTRACT

A method of controlling an object having a first and a second print executed at different stages, the method providing for acquiring an image of the object; calculating a relative deviation between the first print and the second print of the object; forming a virtual specimen image by superimposing a reference image of the first print and a reference image of the second print and taking into account the relative deviation; comparing the image with the specimen image; and emitting an error signal in the event the luminance values of the image fail to fall within an acceptance range of the luminance values of the specimen image, and the relative deviation is above a given value.

16 Claims, 5 Drawing Sheets

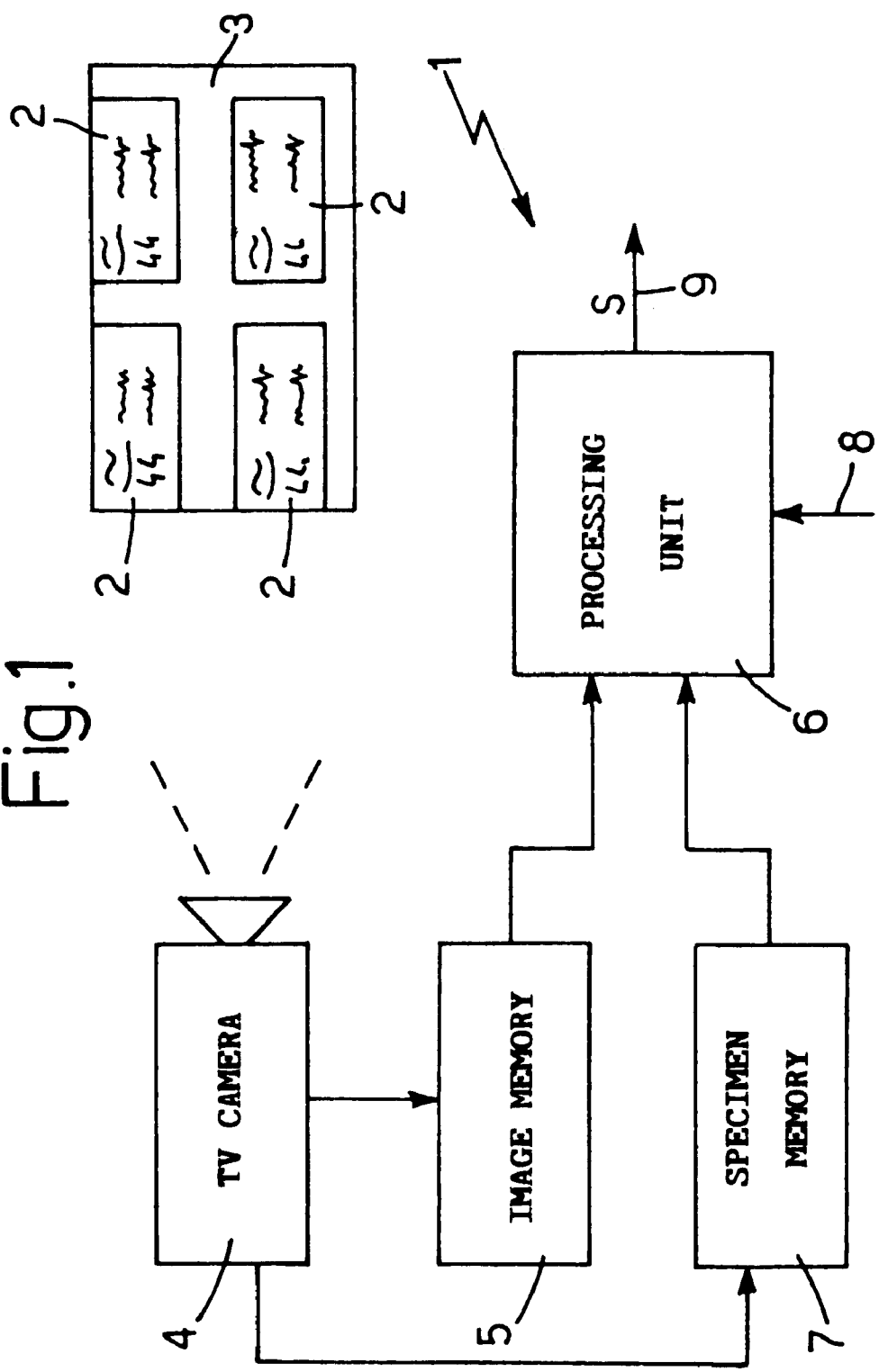

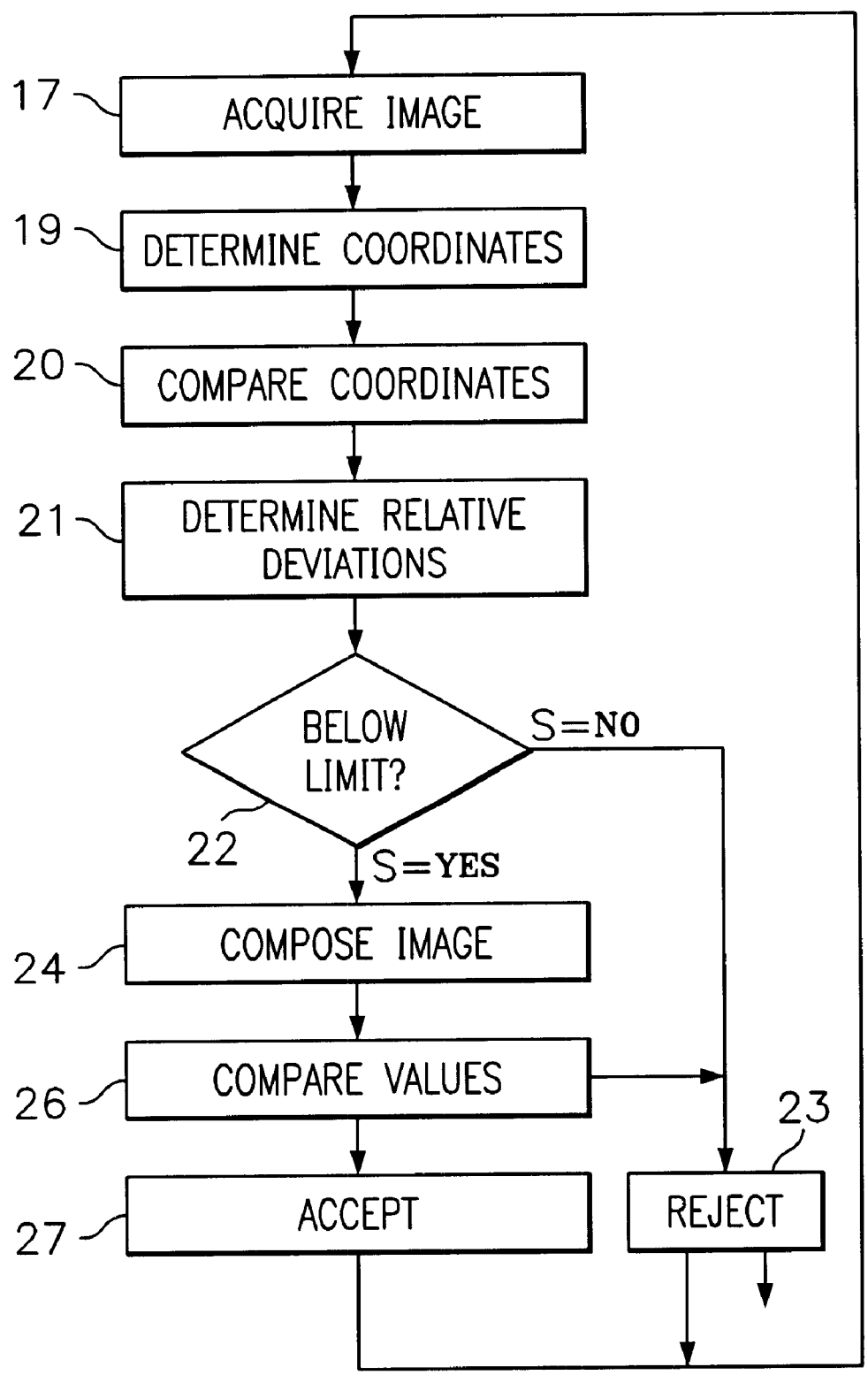

METHOD OF CONTROLLING A PRINTED OBJECT

FIELD OF THE INVENTION

The present invention relates to a method of controlling a printed object.

In particular, the present invention relates to a method of controlling banknotes, to which the following description refers purely by way of example.

BACKGROUND OF THE INVENTION

As is known, banknotes are made from a sheet of such a size as to contain several finished banknotes, and which comprises watermarked regions and/or regions including metal bands, and is fed along a given path along which it undergoes various printing steps, each involving a different printing technique.

The most common printing steps are offset printing, i.e. of images normally representing a coloured background; intaglio or copperplate printing, i.e. of famous figures and/or faces and numbers representing the value of the banknote; and silk-screen printing, i.e. of the serial number. Offset printing is performed on both faces with no alignment with the edge of the sheet, which therefore cannot be used as a reference for the coordinates of the offset printed details.

Intaglio printing is performed at high pressure using a plate, and deforms the paper slightly so that the plate is inclined, and the intaglio print itself possibly misaligned, with respect to the offset print. Intaglio printing is performed on one or both faces of the sheet, and may comprise a number of successive prints, each of which may be misaligned with respect to the offset or other intaglio prints. Misalignment of the various successive prints may take the form of translation along the x and/or y axis, or rotation. Similarly, the silk-screen print may also be translated and inclined with respect to the offset print.

Once offset and intaglio printed, the sheet is quality controlled and cut into separate banknotes. The quality control process consists in assigning a pass or reject signal to each banknote, and only the passed banknotes are silk-screen printed with serial numbers.

Quality control is frequently performed manually by a checker, who ensures the offset and intaglio prints do not deviate too far from an ideal value, and checks for coloring errors, i.e. over- or underinked regions, blurring or other defects.

Alternatively, quality control may also be performed automatically using a television camera, which assigns each pixel a characteristic luminance value of a given banknote surface associated with the pixel, and compares these values with given reference values. Automatic control is complicated by numerous factors, foremost of which is determining reference values enabling accurate control of both coloring and misalignment, which in turn is complicated by the luminance of each pixel depending on various factors, such as the printed region partly occupying the surface corresponding to the pixel, and the type of ink and paper used. The problem is further compounded by misalignments of up to a millimeter between the intaglio and offset prints being considered acceptable, and by effective colour control requiring the use of television cameras of such definition that each pixel corresponds to a banknote surface portion of 0.125×0.125 square millimeters. Misalignment to the above extent, in elation to the size of said surface portion, therefore means the luminance value of each pixel may vary within a very wide range, due to the surface portion corresponding to the pixel possibly being fully inked or having no ink at all, particularly when the surface portion in question is located at the edge of a figure. On the other hand, reference values establishing very wide acceptance ranges would fail to provide for effective control by possibly passing banknotes which should be rejected.

SUMMARY OF THE INVENTION

It is an object of the present invention to provide a control method enabling reliable automatic control of both misalignment and coloring.

According to the present invention, there is provided a method of controlling a printed object comprising a first and a second print executed at different stages; the method comprising the steps of acquiring a first image of the controlled object; comparing said first image with a specimen second image; calculating a relative deviation between the first print and said second print of said object; and emitting an error signal in the event the luminance values of the first image fail to fall within an acceptance range of the luminance values of the second image, or said relative deviation is above a given value; said method being characterized in that said second image is a virtual image formed by superimposing a reference third image of the first print and a reference fourth image of the second print, and taking into account said relative deviation.

The method according to the present invention is particularly advantageous by controlling relative deviation of the first and second prints and coloring in two separate steps using a specimen image which takes into account existing relative deviations of the first and second prints, thus enabling precise, reliable acceptance ranges to be established.

BRIEF DESCRIPTION OF THE DRAWINGS

A non-limiting embodiment of the present invention will be described by way of example with reference to the accompanying drawings, in which:

FIG. 1 shows a schematic view, with parts removed for clarity, of a device implementing the method according to the present invention;

FIG. 6 shows an overall block diagram of the method according to the present invention;

DETAILED DESCRIPTION OF THE INVENTION

Figure 4:
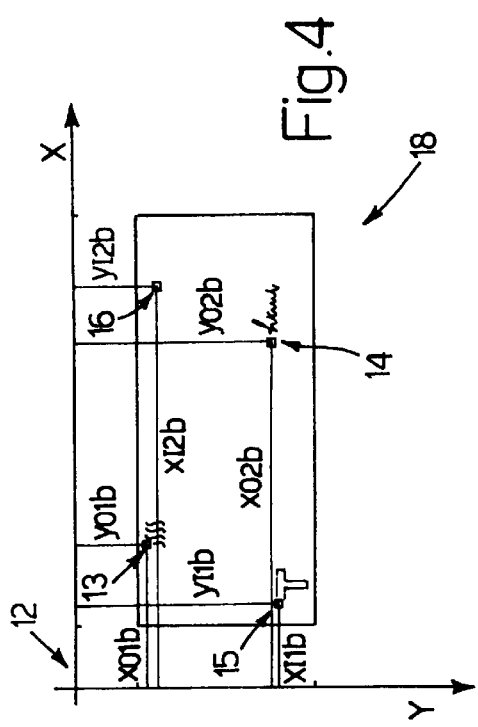
FIGS. 2 to 5 show images used to implement the method according to the present invention.

Number 1 in FIG. 1 indicates a device for controlling banknotes 2 printed on a sheet 3. Control device 1 comprises a television camera 4 for picking up one banknote 2 at a time and generating a discrete, digitized grey-tone television signal which is transmitted to an image memory 5. Image memory 5 stores the images of banknotes 2 in the form of a matrix of dots or so-called pixels P, each of which is assigned a value Vb related to the grey level, i.e. luminance, of pixel P. Each pixel P corresponds to a 0.125 mm square of banknote 2, and value Vb represents a mean value of the luminance of the square.

Image memory 5 is connected to a processing unit 6, which comprises an image processing section, i.e. an image processor, and a logic section, and which provides for processing and comparing the image of banknote 2 with a given specimen banknote BC. For which purpose, processing unit 6 is connected to a specimen memory 7 structured according to the method of generating one or more specimen banknotes BC, as described later on. Processing unit 6 also comprises an input 8 by which processing unit 6 receives external data and commands, and an output 9 by which processing unit 6 supplies a signal S indicating acceptance or rejection of the controlled banknote 2.

Banknote 2 is produced using a known method comprising the steps of advancing sheet 3, which is sized to contain a number of banknotes 2; printing, in one printing step, the graphic portion of the image representing the coloured background of each banknote 2, and which is commonly referred to as the offset print O; printing, in one printing step, the portion representing the dark image and value figures of each banknote 2, and which is commonly referred to as the intaglio or copperplate print I; controlling the quality of the printing; printing the serial numbers on the accepted banknotes 2; and cutting sheet 3 to separate each banknote 2 in said number of banknotes 2 from the others.

Figure 3:
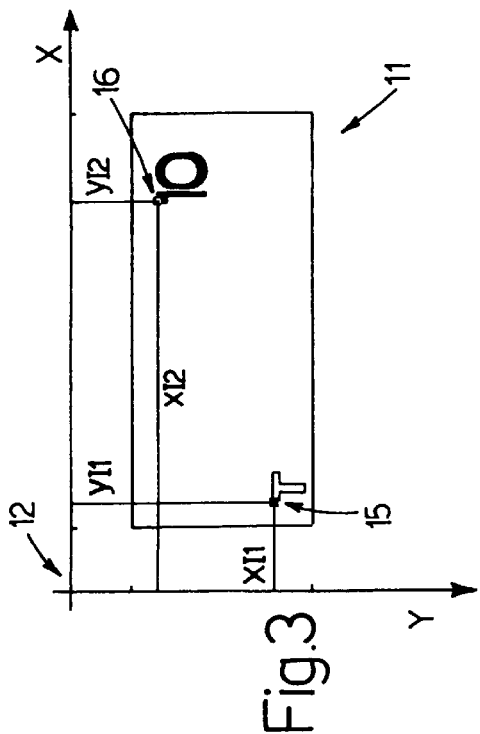
Figure 2:
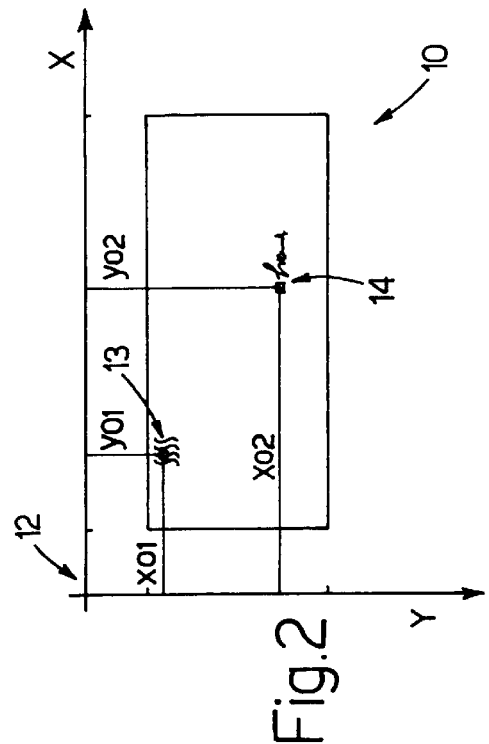

Besides acquiring the images of the fully printed banknotes 2, i.e. comprising offset print O and intaglio print I, device 1, before commencing control of banknotes 2, acquires a reference image 10 of offset print O without intaglio print I, and a reference image 11 of intaglio print I without offset print O, and stores in specimen memory 7 the characteristic luminance values VOp and VIp of respective images 10 and 11. As shown more clearly in FIG. 2, image 10 is related to a Cartesian reference system 12 comprising an X axis and a Y axis; two characteristic, clearly distinguishable elements 13 and 14 of offset print O are selected from image 10; and the coordinates XO1 and YO1 of characteristic element 13, and the coordinates XO2 and YO2 of characteristic element 14 with respect to reference system 12 are calculated. Similarly, and as shown clearly in FIG. 3, image 11 is related to Cartesian reference system 12; two characteristic, clearly distinguishable elements 15 and 16 of intaglio print I are selected from image 11; and the coordinates XI1 and YI1 of characteristic element 15, and the coordinates XI2 and YI2 of characteristic element 16 are calculated. The characteristic luminance values VOp of each pixel P in image 10 and the characteristic luminance values VIp of each pixel P in image 11 are stored in specimen memory 7 together with coordinates XO1, YO1, XO2, YO2, XI1, YI1, XI2, YI2 of characteristic elements 13, 14, 15 and 16.

In practice, characteristic elements 13, 14, 15 and 16 form part of predetermined selected regions of the image of camera 4, which are processed in known manner to extract characteristic elements 13, 14, 15 and 16; and processing unit 6 provides for determining coordinates XO1, YO1, XO2, YO2, XI1, YI1, XI2, YI2 of characteristic elements 13, 14, 15 and 16.

The FIG. 6 block diagram shows, schematically, the steps in the control of banknotes 2. In detail, control commences with a block 17, which represents the acquisition of an image 18 of banknote 2. At this step, for each pixel P, camera 4 supplies image memory 5 with values Xp and Yp of the respective coordinates with respect to reference system 12, and the characteristic luminance value Vb of pixel P. As shown in FIG. 4, image 18 is related to Cartesian reference system 12, and comprises the same elements 13 and 14 of offset print O and the same characteristic elements 15 and 16 of intaglio print I as images 10 and 11.

As described previously, in block 19 the positions, with respect to reference system 12, of characteristic elements 13, 14, 15 and 16 of image 18 of banknote 2 are determined, which means determining, with respect to reference system 12, the coordinates XO1b, YO1b, XO2b, YO2b of characteristic elements 13 and 14 of offset print O, and coordinates XI1b, YI1b, XI2b, YI2b of characteristic elements 15 and 16 of intaglio print I.

In block 20, coordinates XO1b, YO1b, XO2b and YO2b are compared with coordinates XO1, YO1, XO2 and YO2, and deviations DXO1, DYO1, DXO2 and DYO2 between the coordinates, i.e. between characteristic elements 13 and 14 of offset print O in image 18 of banknote 2 and characteristic elements 13 and 14 of offset print O in reference image 10, are calculated by means of the following operations:

$$DXO1 = XO1 - XO1b \text{ (element 13)}$$

$$DYO1 = YO1 - YO1b \text{ (element 13)}$$

$$DXO2 = XO2 - XO2b \text{ (element 14)}$$

$$DYO2 = YO2 - YO2b \text{ (element 14)}$$

On the basis of the above coordinates, angular deviation DBO is also calculated at this step in the form of an angular coefficient as follows:

$$DBO = (XO2 - XO1)/(YO2 - YO1) - (XO2b - XO1b)/(YO2b - YO1b)$$

In block 20, absolute deviations DXI1, DYI1, DXI2 and DYI2 between characteristic elements 15 and 16 of intaglio print I in image 18 and characteristic elements 15 and 16 of intaglio print I in reference image 11 are also calculated by means of the following operations:

$$DXI1 = XI1 - XI1b \text{(element 15)}$$

$$DYI1 = YI1 - YI1b \text{(element 15)}$$

$$DXI2 = XI2 - XI2b \text{(element 16)}$$

$$DYI2 = YI2 - YI2b \text{(element 16)}$$

On the basis of the above coordinates, angular deviation DBI is also calculated at this step in the form of an angular coefficient as follows:

$$DBI = (XI2 - XI1)/(YI2 - YI1) - (XI2b - XI1b)/(YI2b - YI1b)$$

On the basis of absolute deviations DXO1, DYO1, DXO2, DYO2 and DBO of offset print O, and absolute deviations DXI1, DYI1, DXI2, DYI2 and DBI of intaglio print I, block 21 determines the relative deviations DX1R, DY1R, DX2R, DY2R and DBR between offset print O and intaglio print I in image 18 of controlled banknote 2.

In block 22, relative deviations DX1R, DY1R, DX2R and DY2R are compared with a respective linear limit value LR, usually equal to one millimeter, and relative angular deviation DBR is compared with a limit angular coefficient value BR. If relative deviations DX1R, DY1R, DX2R and DY2R are below respective limit values LR and BR, an acceptance signal S=YES is emitted. Conversely, if said relative deviations are above respective limit values LR and BR, a NO signal S is emitted and banknote 2 is rejected, as shown in block 23.

Figure 5:
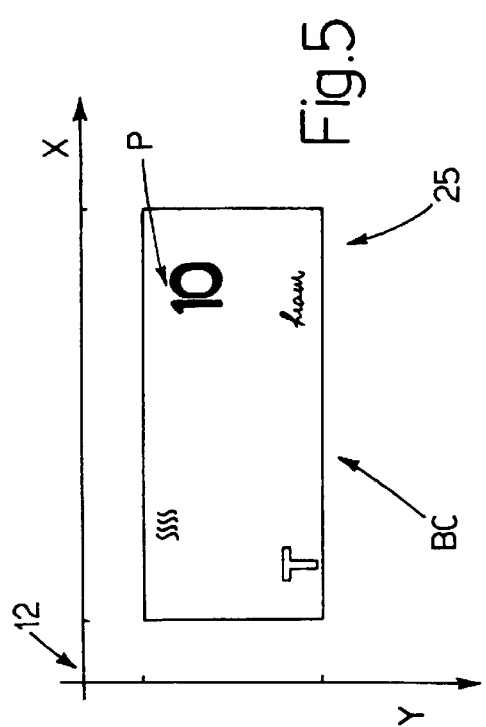

Acceptance signal S=YES permits access to block 24 where a virtual image 25 of specimen banknote BC is composed from images 10 and 11, as shown in FIG. 5. Taking into account relative deviations DX1R, DY1R, DX2R, DY2R and DBR between offset print O and intaglio print I, image 25 of specimen banknote BC is composed by superimposing images 10 and 11 by adding the VOp and VIp values of homologous X and Y coordinates of images 10 and 11. To determine which X and Y coordinates are homologous, block 24, on the basis of the deviations determined, determines the deviations DXOp, DYOp and DXIp, DYIp of each pixel P in image 18 with respect to respective reference images 10 and 11, so that homologous coordinates are determined on the basis of the following equations:

$$Xp=XOp-DXOp=XIp-DXIp$$

$$Yp=YOp-DYOp=YIp-DYIp$$

The pixel P (Xp, Yp) of specimen banknote BC is assigned a Vp(Xp,Yp) value which is a function of values VOp(XOp,YOp) and VIp(XIp,YIp) and of correction coefficients Cos and Cis, Cic. In practice, the value assigned to each pixel P of virtual image 25 is given by the following equation:

$$Vp(Xp,Yp)=Cos*(1-Cic)*VOp(XOp,YOp)+Cis*Cic*VIp(XIp,YIp)$$

Figure 7:
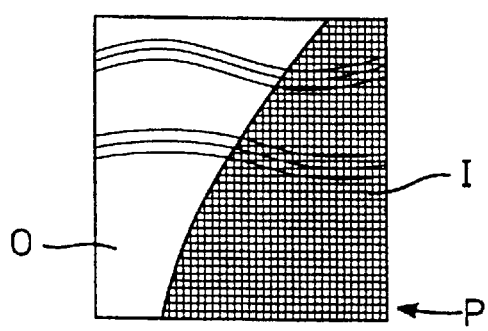
FIG. 7 shows a larger-scale view of a detail in FIG. 5.

Coefficient Cic represents the percentage of pixel P (FIG. 7) covered by intaglio print I, and is determined by analyzing reference image 11 from which coefficient Cic of each pixel P may be determined. As the ink used for the intaglio print has a fairly high covering capacity, at any rate capable of covering the offset print O ink, the percentage of pixel P covered by offset print O is complementary to the covering percentage of intaglio print I, i.e. equal to 1-Coc. Coefficient Cos depends on, and takes into account the covering capacity of, the type of ink used for offset print O; similarly, coefficient Cis depends on, and takes into account the covering capacity of, the type of ink used for intaglio print I; and coefficients Cos and Cis are determined experimentally by actually superimposing reference images 10 and 11 and determining the luminance values. In practice, coefficients Cos, Cis and Cic take into account the types of ink and the gradations between the offset print O and intaglio print I, and are stored in specimen memory 7 where they are associated with respective X and Y coordinates of respective reference images 10 and 11.

Once image 25 of specimen banknote BC is obtained, block 24 goes on to block 26, where processing unit 6 compares the Vb values of each pixel P with the Vp values of the corresponding coordinates. If the Vb values determined fall within an acceptance range R in the neighborhood of the corresponding Vp values, banknote 2 is accepted (block 27); conversely, if a determined Vb value falls outside acceptance range R, banknote 2 is rejected (block 23).

At this point, regardless of whether banknote 2 has been accepted or rejected, the control operations are terminated, and block 17 commences control of the next banknote 2, for which device 1 forms a respective image 25 of specimen banknote BC as described above.

In practice, the system described provides for determining whether banknote 2 comprises acceptable relative deviations between the images of offset print O and intaglio print I; and, if so, for constructing an image 25 of specimen banknote BC on the basis of the data stored in specimen memory 7, i.e. luminance values VOp of the offset print O image and luminance values VIp of intaglio print I, and on the basis of the relative deviations and correction coefficients Cic, Cis and Cos.

Figure 8:
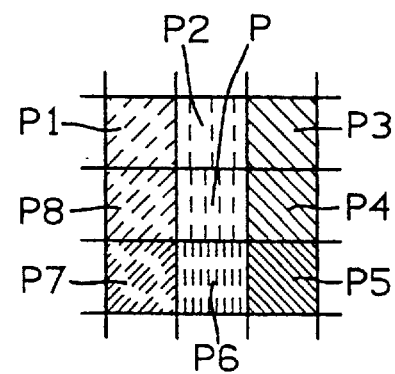
FIG. 8 shows a larger-scale view of a detail in FIG. 5.

With reference to FIG. 8, gradients G1, ..., G8 of each pixel P with respect to adjacent pixels P1, ..., P8 are calculated on the basis of the luminance values Vp of each pixel P in image 25 of specimen banknote BC.

Acceptance range R of each pixel P is determined as a function of gradient values G1, ..., G8 and according to a law whereby the size of range R is directly proportional to gradient values G1, ..., G8.

Figure 9:
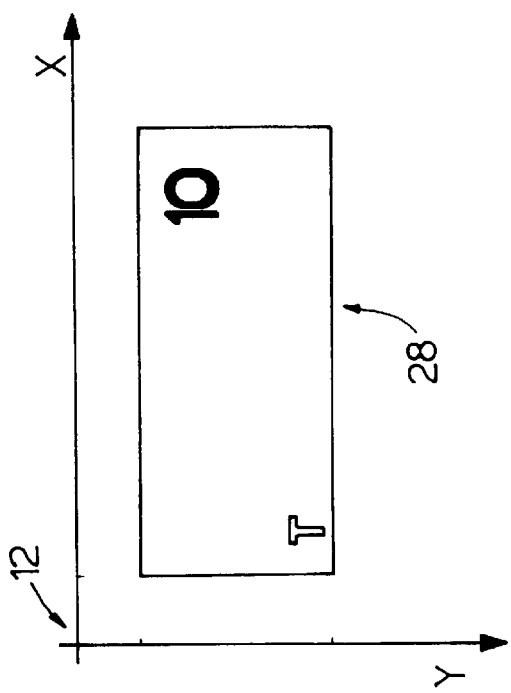
FIGS. 9 and 10 show plan views of images by which to implement a variation of the method according to the invention.

In the FIG. 9 variation, to determine image 25 of specimen banknote BC, image 11 of the intaglio print is replaced by a virtual image 28 of intaglio print I, obtained as a function of image 18 of any banknote 2, of image 10 of offset print O, and of deviations DXO1, DYO1, DXO2, DYO2 and DBO between elements 13 and 14 of image 10 and elements 13 and 14 of image 18.

In other words, virtual image 28 of intaglio print I is obtained by determining the luminance values Vb of respective pixels P of banknote 2, and deviations DXO1, DYO1, DXO2, DYO2 and DBO. Values VOp of respective pixels P of image 10 of osset print O are contained in memory 5, and are subtracted from respective luminance values Vb to obtain the characteristic values VIb of virtual image 28 of intaglio print I according to the equation:

$$VIp(XIp, YIp)=Vb(Xp,Yp)-VOp(XOp,YOp)$$

where coordinates Xp and Yp of image 18, coordinates XOp and YOp of image 10 of offset print O, and coordinates XIp and YIp of virtual image 28 of intaglio print I are related according to the equations:

$$Xp=XOp-DXOp=XIp$$

$$Yp=YOp-DYOp=YIp$$

Luminance values VIp determined according to the above equations are stored in memory 5 and added, at each control cycle, to respective values VOp to obtain virtual image 25 of the specimen banknote BC to be compared with a respective image 18 of a banknote 2. Values Vp of image 25 are obtained according to the equation:

$$Vp(Xp, Yp)=VOp(XOp,YOp)+VIp(XIp,YIp)$$

where coordinates Xp and Yp of banknote 2, coordinates XOp and YOp of image 10 of offset print O, and coordinates XIp and YIp of virtual image 28 of intaglio print I are related according to the equations:

$$Xp=XOp-DXOp=XIp-DXIp$$

$$Yp=YOp-DYOp=YIp-DYIp$$

The variation described eliminates the need for correction coefficients Cos, Cic and Cis, and so provides for simplifying the equations for obtaining values VP.

Figure 10:
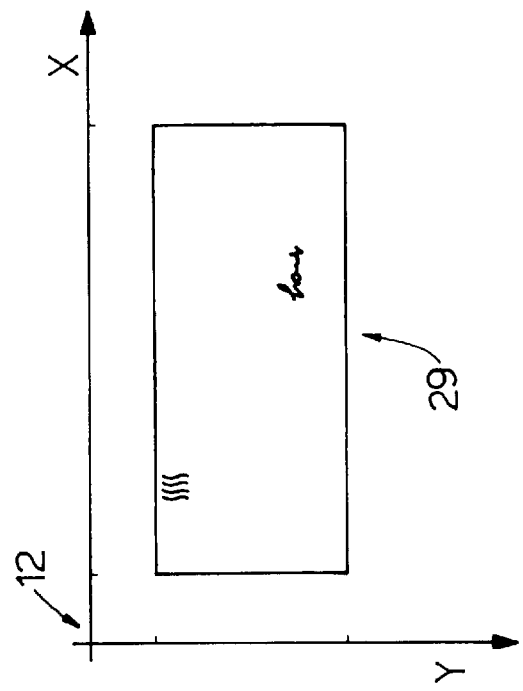

Clearly, image 10 of offset print O may also be replaced by a virtual image 29 (FIG. 10) of offset print O, obtained by subtracting luminance values Vb of image 18 of a banknote 2 and the luminance values of image 11 of intaglio print I.

What is claimed is:

1. A method of controlling a printed object comprising a first and a second print (O, I) executed at different stages; the method comprising the steps of acquiring a first image (18) of the controlled object (2); comparing said first image (18) with a specimen (BC) second image (25); calculating a relative deviation (DX1R, DY1R, DX2R, DY2R, DBR) between the first print (O) and the second print (I) of said object (2); and emitting an error signal in the event the luminance values of the first image (18) fail to fall within an acceptance range (R) of the luminance values of the second image (25), or said relative deviation (DX1R, DY1R, DX2R, DY2R, DBR) is above a given value; said method being characterized in that said second image (25) is a virtual image formed by superimposing a reference third image (10; 29) of the first print (O) and a reference fourth image (11, 28; 11) of the second print (I), and taking into account said relative deviation (DX1R, DY1R, DX2R, DY2R, DBR).

2. A method as claimed in claim 1, characterized by selecting two first characteristic elements (13, 14) of the third image (10; 29); selecting two second characteristic elements (15, 16) of the fourth image (11, 28; 11); selecting said characteristic elements from the first image (18); determining a first deviation (DXO1, DYO1, DXO2, DYO2, DBO) of said first characteristic elements (13, 14) between the third image (10; 29) and the first image (18); and determining a second deviation (DXI1, DYI1, DXI2, DYI2, DBI) of said second characteristic elements (15, 16) between the fourth image (11, 28; 11) and the first image (18).

3. A method as claimed in claim 2, characterized in that said relative deviation (DX1R, DY1R, DX2R, DY2R, DBR) is a function of the first and second deviation (DXO1, DYO1, DXO2, DYO2, DBO, DXI1, DYI1, DXI2, DYI2, DBI).

4. A method as claimed in claim 1, characterized in that said first image (18) corresponds to a first series of values (Vb); the second image (25) corresponds to a second series of values (Vp); the third image (10; 29) corresponds to a third series of values (VOp); and the fourth image (11, 28; 11) corresponds to a fourth series of values (VIp).

5. A method as claimed in claim 1, characterized in that said first image (18), said second image (25), said third image (10; 29) and said fourth image (11, 28; 11) are defined by respective matrixes of pixels (P), each pixel (P) corresponding to a respective given surface portion of a respective first image (18), second image (25), third image (10; 29) and fourth image (11, 28; 11).

6. A method as claimed in claim 4, characterized in that said second series of values (Vp) is a function of said third series of values (VOp) and of said fourth series of values (VIp).

7. A method as claimed in claim 6, characterized in that said second series of values (Vp) is a function of correction coefficients (Cic, Cos, Cis) of said third and said fourth series of values (VOp; VIp).

8. A method as claimed in claim 7, characterized in that said coefficients comprise a first coefficient (Cic) proportional to the portion of pixel (P) covered by the second print (I).

9. A method as claimed in claim 5, characterized in that each pixel (P) in said fourth image (11) is assigned a value of the first coefficient (Cic).

10. A method as claimed in claim 7, characterized in that said coefficients (Cic, Cos, Cis) comprise a second coefficient (Cos) proportional to the covering capacity of the first print; and a third coefficient (Cis) proportional to the covering capacity of the second print (I).

11. A method as claimed in claim 5, characterized in that each pixel (P) in said third image (10) is assigned a value Of said second coefficient (Cos), and each pixel (P) in said fourth image (11) is assigned a value of said third coefficient (Cis).

12. A method as claimed in claim 10, characterized in that said second and third coefficient (Cos, Cis) are determined experimentally.

13. A method as claimed in claim 1, characterized in that said fourth image (11, 28; 11) is a virtual image (28); said fourth image (28) being obtained as a function of the first image (18), of the third image (10), and of said first deviation (DXO1, DYO1, DXO2, DYO2, DBO).

14. A method as claimed in claim 1, characterized in that said third image (10; 29) is a virtual image (29); said third image (29) being obtained as a function of said first image (18), of the fourth image (11), and of said second deviation (DXI1, DYI1, DXI2, DYI2, DBI).

15. A method as claimed in claim 1, characterized in that each pixel (P) in said second image (25) is assigned a respective given acceptance range (R).

16. A method as claimed in claim 15, characterized by calculating the gradients (G1, . . . , G8) of the luminance values (Vp) of each pixel (P) in said second image (25) with respect to the pixels (P1, . . . , P8) adjacent to said pixel (P); the size of said acceptance range (R) being directly proportional to the gradients (G1, . . . , G8) of the respective pixel (P).

* * * * *